(12) United States Patent
Bourqui

(10) Patent No.: US 9,168,828 B2
(45) Date of Patent: Oct. 27, 2015

(54) ACTUATOR WITH PROGRESSIVE GEAR

(71) Applicant: Johnson Electric S.A., Murten (CH)

(72) Inventor: Yvan Bourqui, Corminboeuf (CH)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 14/284,161

(22) Filed: May 21, 2014

(65) Prior Publication Data

US 2014/0345400 A1  Nov. 27, 2014

(30) Foreign Application Priority Data

May 21, 2013  (GB) .................................... 1309166.5

(51) Int. Cl.
*B60K 11/00* (2006.01)
*B60K 11/08* (2006.01)
*F16H 19/08* (2006.01)

(52) U.S. Cl.
CPC .............. *B60K 11/085* (2013.01); *F16H 19/08* (2013.01); *Y10T 74/188* (2015.01)

(58) Field of Classification Search
CPC ....... B60K 11/085; B60K 11/08; F16H 19/08
USPC .............................. 180/68.1, 68.2, 68.4, 68.6; 123/41.02–41.07; 415/121.2, 220, 222; 137/601.09, 601.14; 165/98; 296/50, 296/57.1, 180.5; 160/DIG. 1
See application file for complete search history.

(56) References Cited

U.S. PATENT DOCUMENTS

| | | | |
|---|---|---|---|
| 263,791 A | 9/1882 | Leclere | |
| 277,988 A | 5/1883 | Burk | |
| 2,061,322 A | 11/1936 | Massa, Jr. | |
| 4,064,934 A * | 12/1977 | Kolthoff et al. | .................. 165/97 |
| 5,215,044 A * | 6/1993 | Banzhaf et al. | ............ 123/41.29 |
| 5,732,666 A * | 3/1998 | Lee | .............................. 123/41.05 |
| 6,031,226 A | 2/2000 | Parekh et al. | |
| 6,145,251 A * | 11/2000 | Ricci | ............................. 49/82.1 |
| 6,761,083 B1 | 7/2004 | Grill | |
| 8,084,982 B2 | 12/2011 | Grabinger et al. | |
| 8,161,919 B2 * | 4/2012 | Klotz et al. | ................ 123/41.04 |
| 8,196,487 B2 | 6/2012 | Bless et al. | |
| 8,302,715 B2 * | 11/2012 | Lee et al. | ...................... 180/68.1 |
| 8,505,660 B2 * | 8/2013 | Fenchak et al. | ............. 180/68.1 |
| 8,544,581 B2 * | 10/2013 | Stokes et al. | ................. 180/68.1 |
| 8,561,738 B2 * | 10/2013 | Charnesky et al. | .......... 180/68.1 |
| 8,561,739 B2 * | 10/2013 | Hori | ............................. 180/68.1 |
| 8,662,569 B2 * | 3/2014 | Klop | .......................... 296/193.1 |
| 8,720,624 B2 * | 5/2014 | Remy et al. | ................... 180/68.1 |
| 8,727,054 B2 * | 5/2014 | Hori et al. | ..................... 180/68.1 |
| 8,887,846 B2 * | 11/2014 | Yoo | .............................. 180/68.1 |
| 8,919,470 B2 * | 12/2014 | Hori | ............................. 180/68.1 |
| 8,960,343 B2 * | 2/2015 | Asano et al. | ................... 180/68.1 |
| 8,967,308 B2 * | 3/2015 | Saito et al. | .................... 180/68.1 |

(Continued)

FOREIGN PATENT DOCUMENTS

DE  26 18 715 A1  11/1977

*Primary Examiner* — James M Dolak

(74) *Attorney, Agent, or Firm* — Muncy, Geissler, Olds & Lowe, P.C.

(57) ABSTRACT

An actuator for a grille shutter assembly of a vehicle has a motor connected to an output via a gear train. The output has a connection for connecting to louvers of the grille shutter assembly. The gear train has a gear ratio which is variable depending on the actuation angle of the output shaft. Optionally, a return spring is arranged to resiliently return the output shaft to an initial actuation angle when the motor is not active.

11 Claims, 3 Drawing Sheets

(56) References Cited

U.S. PATENT DOCUMENTS

| | | | |
|---|---|---|---|
| 8,983,735 B2 * | 3/2015 | Konishi et al. | 701/49 |
| 8,983,736 B2 * | 3/2015 | Hirota et al. | 701/49 |
| 9,031,748 B2 * | 5/2015 | Sakai | 701/49 |
| 2005/0107027 A1 | 5/2005 | Kachi | |

* cited by examiner

ACTUATOR WITH PROGRESSIVE GEAR

CROSS REFERENCE TO RELATED APPLICATIONS

This non-provisional patent application claims priority under 35 U.S.C. §119(a) from Patent Application No. GB1309166.5 filed in The United Kingdom on May 21, 2013.

FIELD OF THE INVENTION

This invention relates to an actuator and in particular, to an actuator of a grille shutter assembly having a progressive gear.

BACKGROUND OF THE INVENTION

Automated grille shutters for regulation of louver angle and thus air flow are increasingly important constituents of automotive engine thermal management systems. Regulation is conveniently accomplished by means of electromechanical actuators. The actuators turn the louvers of the grille shutter, generally through a gear train, to vary the size of the opening for air to flow to cool the radiator.

Open loop operation of stepper motor actuators is a reliable state of the art technique. In case of power failure or in any situation of incorrect louver positioning at shut down, however, a fail safe mechanism must be integrated in the grille shutter actuator. A return spring can for instance bring the louvers to an initial position (open or closed, whatever is required). In that case, when in operation, the actuator has to work permanently against the spring force plus any additional forces due to intense air flow when the vehicle is traveling at high speed. Normally that would require an over dimensioned or over powered electromagnetic motor to deliver the maximum torque at the extreme open (or closed) position. It also means high electric power consumption, which is not in accordance with an efficient environmentally-friendly or "green" system.

Hence there is a desire for an actuator for a vehicle grille shutter system, in which the output of the motor is more closely matched to the required output of the actuator. The present invention solves this problem by means of a progressive gear which compensates for the variable torque requirements.

Progressive or variable gears have been known for a long time. A comprehensive description of a progressive gear can be found in U.S. Pat. No. 2,061,322 or U.S. Pat. No. 8,196,487. In automotive applications progressive gears frequently appear in steering systems.

SUMMARY OF THE INVENTION

Accordingly, in one aspect thereof, the present invention provides an actuator for a grille shutter assembly, comprising: a motor having a motor shaft; an output, including an output shaft and a connection for connecting to louvers of the grille shutter assembly; and a gear train connecting the motor shaft to the output shaft, wherein the gear train has a gear ratio that is variable depending on the actuation angle of the output shaft.

Preferably, the gear train comprises at least one progressive gear.

Preferably, the progressive gear comprises a first spiral gear wheel and a second spiral gear wheel in mesh with the first spiral gear wheel.

Preferably, the second spiral gear wheel is fixed to the output shaft.

Preferably, the first spiral gear wheel is connected to the motor shaft by at least one spur gear.

Preferably, the first and second spiral gear wheels have logarithmic pitch paths.

Preferably, a return spring is arranged to resiliently return the output shaft to an initial actuation angle when the motor is not active.

Preferably, the return spring is a coil spring disposed about the output shaft with one end fixed to the second spiral gear wheel and a second end fixed to a part supporting the output shaft.

Preferably, the motor is a stepper motor and is connected to a PCB having a control circuit for controlling the motor in response to control signals.

Preferably, the output comprises two output shafts.

According to another aspect, the present invention provides a grille shutter assembly for a vehicle, comprising: a frame; at least one set of louvers pivotably connected to the frame and an actuator according to any one of the preceding claims, the actuator being arranged to pivotably adjust the orientation of the louvers with respect to the frame.

Preferably, the or each output shaft has a star shaped socket in an end thereof and the louvers are pivotably adjusted by an actuation shaft that has an end received in the star shaped socket.

The present invention allows the construction of an actuator for a grille shutter which has an output which more closely follows the operating requirements of the load, i.e. the grille shutter, thus allowing a smaller, more efficient actuator for this application. Certain embodiments of the invention allow for the construction of a fail safe actuator which can be used in an open loop operation. This eliminates the need for a sensor system to detect the actual position of the grille shutter louvers, as needed by prior art actuators, reducing complexity and cost.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
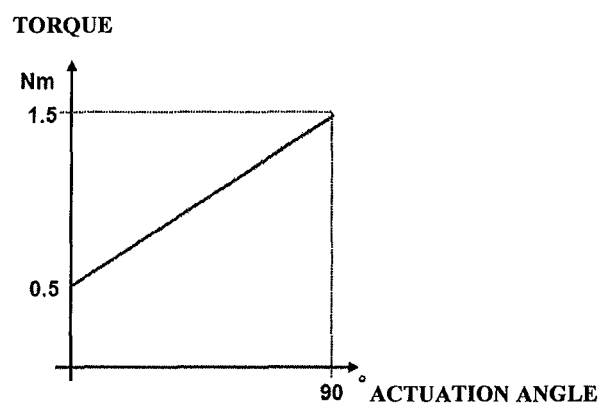
FIGS. 1 and 2 show typical torque versus angle curves the grille shutter actuator is required to deliver, FIG. 1 showing a linear increase and FIG. 2 showing an exponential increase, with respect to the actuation angle.
Figure 2:
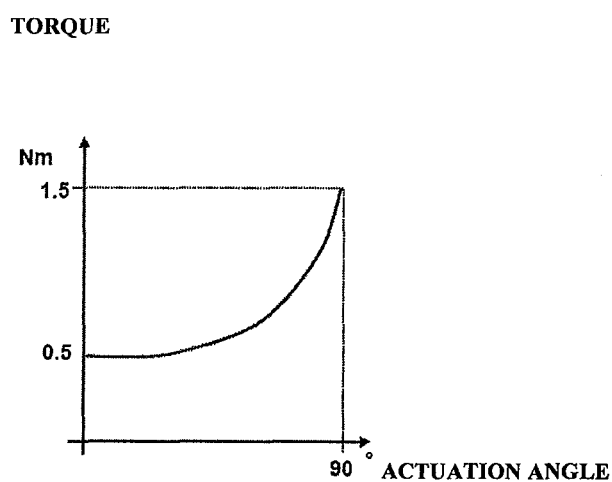

FIGS. 1 & 2 illustrate examples of required grille shutter actuator output torque with integrated return spring for fail safe operation. FIG. 1 shows a torque v position curve for a system having a linear relationship between the position of the louvers or the output of the actuator (actuation angle) and the required torque. FIG. 2 shows a similar graph for a system having an exponential relationship. In addition to a mostly constant mechanical friction offset, the actuator has to overcome an increasing torque with increasing actuation angle due to the return spring. The force applied to the actuator by the air pressure on the louvers, also changes with the actuation angle.

Figure 3:
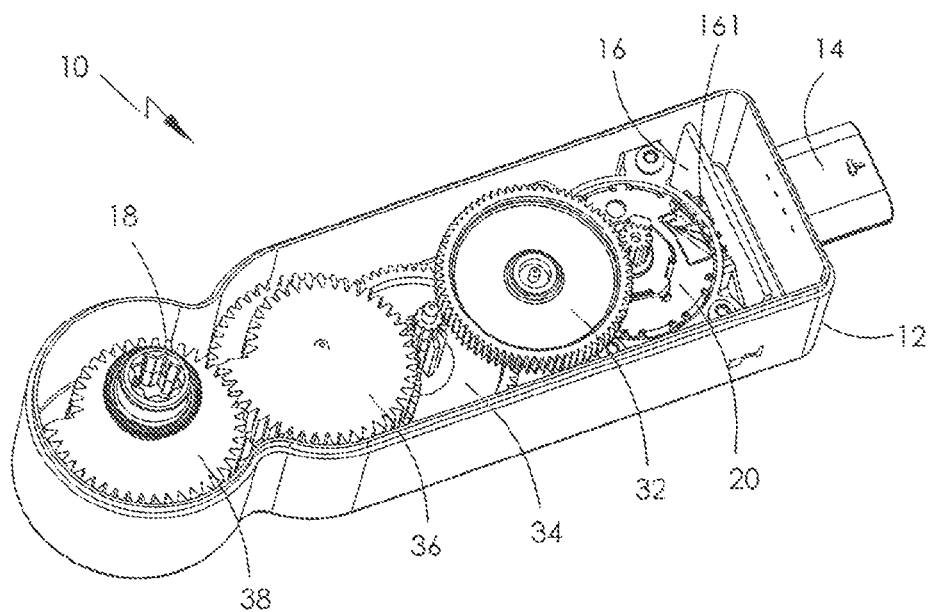
FIG. 3 is a view of the assembled actuator according to the preferred embodiment with a cover removed.

FIG. 3 illustrates the preferred actuator, in assembled form, with a cover removed to show the insides. The actuator 10 has a casing 12 with a lid (not shown), accommodating a stepper motor 20, an output 18 and a gear train 30 connecting the motor to the output. An electrical socket 14 provides connection for power and signal lines for operating the motor. A PCB 16 (printed circuit board) is also provided for electronics for controlling the motor based on commands via the signal line. The PCB may include LIN-Bus electronics for communication with an engine management computer. The PCB 16 has a control circuit 161 for controlling the motor in response to control signals.

Figure 4:
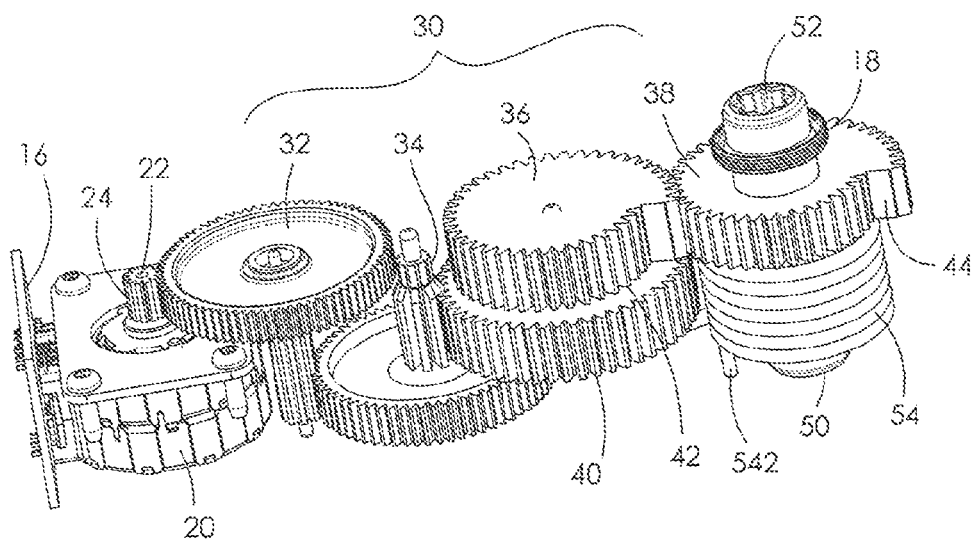
FIG. 4 illustrates a gear train arrangement of the actuator of the preferred embodiment.

The gear train 30 is more clearly shown in FIG. 4. The gear train connects the shaft 22 of the motor to the output 18 of the actuator. The motor of the preferred embodiment is a stepper motor 20 and is shown in FIG. 4 connected to the PCB 16. The output 18 of the actuator, in the preferred embodiment, is a shaft 50 having a star shaped socket 52 for receiving an end of a spigot or actuation shaft of the grille shutter mechanism for changing the angle of the louvers.

The gear train 30 comprises a first spur gear 32 in mesh with a cog 24 fitted to the motor shaft 22, a second spur gear 34 in mesh with the first spur gear, a first progressive gear 36 and a second progressive gear 38. The first progressive gear is a combination of a regular spur wheel 40 with a first spiral gear wheel 42. The spur wheel 40 is in mesh with the second spur gear 34 and the first spiral gear wheel 42 is in mesh with the second progressive gear 38. The second progressive gear comprises a second spiral gear wheel 44 fixed to the output shaft of the actuator. The second spiral gear wheel 44 is in mesh with the first spiral gear wheel 42.

A return spring 54 is attached to the output shaft 50, preferably via the second spiral gear wheel 44, to return the output shaft to a home position or initial actuation angle when the motor is turned off, back-driving the motor through the gear train. The return spring 54 is shown as a spiral or coil spring disposed about the output shaft 50 with a first end fixed to the shaft by way of the second spiral gear wheel 44 and a second end 542 fixed to the casing 12. Thus in use, as the output shaft is moved from the home position the spring is wound up (or down) creating a resilient restoring force urging the output shaft to return to the home position. The motor 20 is required to drive the output shaft against this restoring force. The motor is also required to drive or hold the output shaft at a desired actuation angle against external forces such as the force applied to the louvers by air pressure especially as the vehicle is moving at high speed such as highway driving.

The progressive gear ratio is formed by the interaction of the two spiral gear wheels. Preferably, the spiral gear wheels 42, 44 are logarithmic gears meaning that their pitch line follows a logarithmic spiral path. The progressive gear ratio changes the maximum output torque of the actuator at different actuation angles. This allows the motor to be physically smaller while still providing the required maximum torque output through the higher gear ratio in the high torque require region while providing fast response time in the lower torque required regions due to the lower gear ratio in that region.

Thus the output torque of the actuator is more closely matched with the load requirements and the motor is not over powered for most of the actuation angles just to satisfy the torque requirements at a particular actuation angle.

A progressive gear may comprise at least one wheel with varying radius as a function of angle, delivering variable torque and variable tangential speed. In order to construct a gear train where the wheels have fixed axes, one advantageous configuration comprises two logarithmically spiral wheels which satisfy the following conditions:
  constant distance between the two wheel axes;
  continuous contact of the gear wheels during one full cycle;
  the radius increases exponentially with the wheel angle $r(\phi)=a \cdot \exp(k \cdot \phi)$; and
  the ratio of input and output wheel angle is logarithmic (as is also true for the torque).

Appropriate dimensioning of the spiral gear wheel parameters allows for compensation of the variable torque. By use of the progressive gear we can significantly reduce the motor size (lower price and weight) and diminish the average power consumption.

Figures 5, 6:
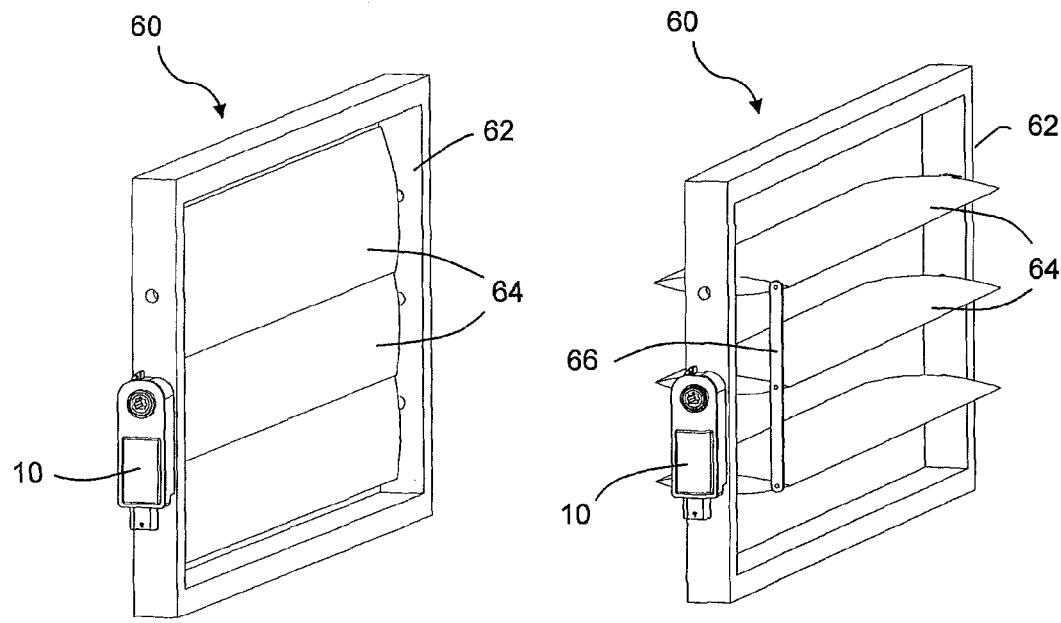
FIG. 5 illustrates a grille shutter assembly for a motor vehicle incorporating the actuator of FIG. 3, with the louvers in a closed orientation.
FIG. 6 illustrates the grille shutter assembly of FIG. 5 with the louvers in a fully open orientation.

FIGS. 5 & 6 are schematic illustrations of a typical grille shutter assembly 60 incorporating the actuator 10 of FIG. 3. The grille shutter assembly has a frame 62 and a number of louvers 64 pivotably connected to the frame. In FIG. 5 the louvers are in the closed orientation to block air flow through the frame and in FIG. 6 the louvers are in the fully open orientation to allow maximum air flow. As can be seen in FIG. 6, the louvers are connected by a cross bar 66 so that the orientations of the louvers are uniform and the louvers are moved in unison. The actuator 10 is connected to the middle louver by an actuation shaft to control the orientation of the louvers.

Figure 7:
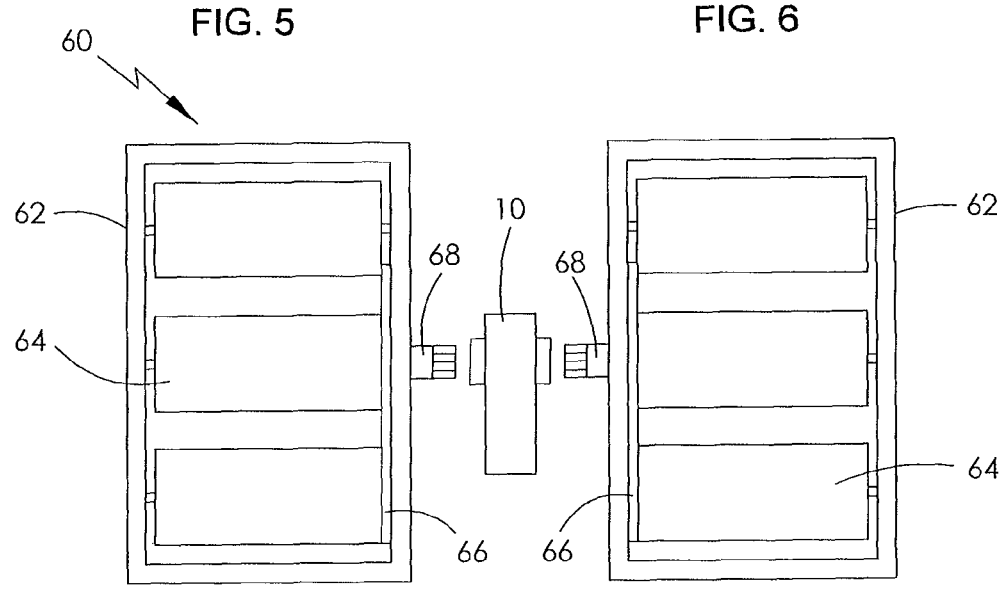
FIG. 7 is a partially exploded view of a grille shutter assembly for a motor vehicle having two sets of louvers.

FIG. 7 is a partially exploded schematic illustration of a grille shutter assembly having two sets of louvers driven by a single actuator. There are two frames 62 pivotably supporting respective sets of louvers 64. The frames are arranged side by side and the actuator is disposed between them, either directly attached to one o the frames or independently mounted. The actuator 10 is connected to each set of louvers by an actuation shaft 68. Each actuation shaft 68 is connected to the output shaft 50 of the actuator by being coupled to the socket 52 formed in each end of the output shaft. Preferably, the shapes of the sockets and the ends of the actuation shafts are complementary, especially star shaped, so that coupling can be achieved by simple insertion.

In use the louvers are arranged in an air flow path leading to the engine compartment and in particular to one or more heat exchanges such as the radiator for engine cooling water and condensers for air conditioning systems. The louvers allow air to flow to the heat exchangers when required and to block air flow when cooling air is not required. Generally the requirement for cooling air is greatly reduced during highway driving and it is in this mode that closing the air intakes, by closing the louvers, improves the aerodynamics of the vehicle resulting in a noticeable improvement in fuel consumption. Closing the air intakes when the vehicle is cold significantly reduces the engine warm up time, the time taken to reach normal operating temperature. This also reduces fuel consumption and the amount of pollution generated by the vehicle as the engine runs more efficiently and cleanly at normal operating temperature.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the actuator has been described as having a housing, the motor, gear train and output shaft could be fixed directly to or supported by a structural part of the grille shutter assembly, such as the frame.

The invention claimed is:

1. An actuator for a grille shutter assembly of a vehicle, comprising:
   a motor having a motor shaft;
   an output, including an output shaft and a connection for connecting to louvers of the grille shutter assembly; and
   a gear train connecting the motor shaft to the output shaft, characterized in that the gear train has a gear ratio that is variable depending on a varied actuation angle of the output shaft; and
   wherein the gear train comprises a first spiral gear wheel and a second spiral gear wheel in mesh with the first spiral gear wheel.

2. The actuator of claim 1, wherein the second spiral gear wheel is fixed to the output shaft.

3. The actuator of claim 1, wherein the first spiral gear wheel is connected to the motor shaft by at least one spur gear.

4. The actuator of claim 1, wherein the first and second spiral gear wheels have logarithmic pitch paths.

5. The actuator of claim 1, further comprising a return spring arranged to resiliently return the output shaft to an initial actuation angle when the motor is not active.

6. The actuator of claim 5, wherein the return spring is a coil spring disposed about the output shaft with one end fixed to the second spiral gear wheel and a second end fixed to a part supporting the output shaft.

7. The actuator of claim 1, wherein the motor is a stepper motor and is connected to a printed circuit board (PCB) having a control circuit for controlling the motor in response to control signals.

8. The actuator of claim 1, wherein the output comprises two output shafts.

9. A grille shutter assembly for a vehicle, comprising a frame; wherein the louvers include at least one set of louvers pivotably connected to the frame and the actuator of claim 1, the actuator being arranged to pivotably adjust the orientation of the louvers with respect to the frame.

10. The grille shutter assembly of claim 9, wherein the output shaft has a non-round socket in an end thereof and the louvers are pivotably adjusted by an actuation shaft that has an end received in the socket.

11. The grille assembly of claim 10, wherein the non-round socket is substantially star shaped.

* * * * *